United States Patent
Li et al.

(10) Patent No.: US 9,635,356 B2
(45) Date of Patent: Apr. 25, 2017

(54) MULTI-HYPOTHESIS MOTION COMPENSATION FOR SCALABLE VIDEO CODING AND 3D VIDEO CODING

(71) Applicant: QUALCOMM Incorporated, San Diego, CA (US)

(72) Inventors: Xiang Li, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 780 days.

(21) Appl. No.: 13/958,262

(22) Filed: Aug. 2, 2013

(65) Prior Publication Data
US 2014/0044179 A1 Feb. 13, 2014

Related U.S. Application Data

(60) Provisional application No. 61/706,649, filed on Sep. 27, 2012, provisional application No. 61/680,507, filed on Aug. 7, 2012.

(51) Int. Cl.
*H04N 19/513* (2014.01)
*H04N 19/159* (2014.01)
(Continued)

(52) U.S. Cl.
CPC ....... *H04N 19/00587* (2013.01); *H04N 19/30* (2014.11); *H04N 19/51* (2014.11);
(Continued)

(58) Field of Classification Search
CPC .... H04N 19/176; H04N 19/573; H04N 19/56; H04N 19/577; H04N 19/61;
(Continued)

(56) References Cited

U.S. PATENT DOCUMENTS

2003/0142748 A1* 7/2003 Tourapis .......... H04N 19/00684
375/240.13
2006/0008038 A1* 1/2006 Song ...................... H04N 19/63
375/350
(Continued)

FOREIGN PATENT DOCUMENTS

WO 2007042063 A1 4/2007
WO 2012047496 A1 4/2012
(Continued)

OTHER PUBLICATIONS

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-TSG.16); <URL: http://wftp3.itu.int/av-arch/jctvc-site/no.jvtcv-k0036 >, Oct. 2, 2012, XP030112968, pp. 1-22.
(Continued)

*Primary Examiner* — Nathnael Aynalem
(74) *Attorney, Agent, or Firm* — Knobbe Martens Olson & Bear LLP

(57) ABSTRACT

An apparatus for coding video information according to certain aspects includes a memory unit and a processor in communication with the memory unit. The memory unit stores video information of a reference layer and an enhancement layer. The processor determines a value of a current video unit of the enhancement layer based on, at least in part, explicit hypotheses and implicit hypotheses calculated from movement information from the reference layer.

42 Claims, 9 Drawing Sheets

(51) Int. Cl.
*H04N 19/51* (2014.01)
*H04N 19/597* (2014.01)
*H04N 19/52* (2014.01)
*H04N 19/30* (2014.01)
*H04N 19/577* (2014.01)
*H04N 19/46* (2014.01)
*H04N 19/573* (2014.01)

(52) U.S. Cl.
CPC .......... *H04N 19/52* (2014.11); *H04N 19/577* (2014.11); *H04N 19/597* (2014.11); *H04N 19/46* (2014.11); *H04N 19/573* (2014.11)

(58) Field of Classification Search
CPC .... H04N 19/513; H04N 19/597; H04N 19/46; H04N 19/51; H04N 19/52; H04N 19/105; H04N 19/109; H04N 19/30; H04N 19/50; H04N 19/521; H04N 19/103; H04N 19/11; H04N 19/107; H04N 19/463; H04N 19/615; H04N 19/187; H04N 19/58
USPC ........................................ 375/240.01–240.29
See application file for complete search history.

(56) References Cited

U.S. PATENT DOCUMENTS

| | | | | |
|---|---|---|---|---|
| 2006/0012719 | A1* | 1/2006 | Karczewicz | H04N 19/187 348/699 |
| 2008/0089411 | A1 | 4/2008 | Wenger et al. | |
| 2008/0095238 | A1* | 4/2008 | Wu | H04N 19/51 375/240.16 |
| 2009/0190662 | A1* | 7/2009 | Park | H04N 19/597 375/240.16 |
| 2010/0215095 | A1* | 8/2010 | Hayase | H04N 19/105 375/240.02 |
| 2011/0176611 | A1* | 7/2011 | Huang | H04N 19/56 375/240.16 |
| 2011/0194609 | A1 | 8/2011 | Rusert et al. | |
| 2011/0261882 | A1* | 10/2011 | Zheng | H04N 19/105 375/240.13 |
| 2012/0257678 | A1* | 10/2012 | Zhou | H04N 19/436 375/240.16 |
| 2013/0106998 | A1 | 5/2013 | Pahalawatta et al. | |

FOREIGN PATENT DOCUMENTS

| | | |
|---|---|---|
| WO | 2012050758 A1 | 4/2012 |
| WO | WO-2012045886 A1 | 4/2012 |

OTHER PUBLICATIONS

Bross B., et al., "High Efficiency Video Coding (HEVC) text specification draft 7," 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-I1003__d0, May 10, 2012, XP030112373, 270 pages.

Flierl M., et al., "Rate-Constrained Multihypothesis Prediction for Motion-Compensated Video Compression," IEEE Transactions on Circuits and Systems for Video Technology, vol. 12, No. 11, Nov. 2002, pp. 957-969.

Girod B., "Efficiency analysis of multihypothesis motion-compensated prediction for video coding," IEEE Transactions on Image Processing, vol. 9, No. 2, Feb. 2000, pp. 173-183.

Guionnet T., et al., "CE5.h related: Merge candidate list extension for disparity compensated prediction", 1 . JCT-3V Meeting; 101. MPEG Meeting; Jul. 16, 2012-Jul. 20, 2012; Stockholm; No. JCT2-A0134, Jul. 10, 2012, XP03130133. pp. 1-3.

Han W.J., et al., "Improved Video Compression Efficiency Through Flexible Unit Representation and Corresponding Extension of Coding Tools," IEEE Transactions on Circuits and Systems for Video Technology, vol. 20 , No. 12, Dec. 2010, pp. 1709-1720.

Hong D., et al., "Scalability Support in HEVC", 97. MPEG Meeting; Jul. 14, 2011-Jul. 22, 2011; Torino; (Motion Picture Expert Group or ISO/IEC JTC1/SC29/WG11), Doc.: JCTVC-F290, No. m20710. Jul. 13, 2011 XP030049273, pp. 1-15.

International Search Report and Written Opinion—PCT/US2013/053627—ISA/EPO—Oct. 29, 2013.

Kamp S., et al., "Decoder side motion vector derivation for inter frame video coding", Image Processing, 2008, ICIP, 15th IEEE International Conference, IEEE, Piscataway, NJ, USA, Oct. 12, 2008, pp. 1120-1123, XP031374203, ISBN: 978-1-4244-1765-0.

Kamp S., et al., "Decoder-side motion vector derivation for hybrid video inter coding", IEEE International Conference on Multimedia and Expo (ICME), Jul. 19-23, 2010 Suntec City, Singapore, Jul. 19, 2010, Jul. 23, 2010, pp. 1277-1280, XP002613773, 2010 IEEE International Conference on Multimedia and Expo (ICME) IEEE Piscataway, NJ, USA DOI: 10.1109/ICME.2010.5583097 ISBN: 978-1-4244-7491-2.

Schwarz H., et al., "Test Model under Consideration for HEVC based 3D video coding v3.0", 100. MPEG Meeting; Apr. 30, 2012-May 4, 2012; Geneva; (Motion Picture Expert Group or ISO/IEC JTC1/SC29/WG11), No. N12744, Jun. 1, 2012, XP030019217, pp. 1-46.

Sullivan G.J., "Multi-hypothesis motion compensation for low bit-rate video coding," 1993 IEEE International Conference on Acoustics, Speech, and Signal Processing, 1993. ICASSP-93., vol. 5, pp. 437-440.

* cited by examiner

MULTI-HYPOTHESIS MOTION COMPENSATION FOR SCALABLE VIDEO CODING AND 3D VIDEO CODING

CROSS REFERENCE TO RELATED APPLICATIONS

This application claims priority to U.S. Provisional Patent Application No. 61/706,649, filed Sep. 27, 2012, and from U.S. Provisional Patent Application No. 61/680,507, filed Aug. 7, 2012, both of which are incorporated by reference in their entirety.

BACKGROUND

Field of the Invention

This disclosure relates to video coding.

Description of the Related Art

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY OF THE DISCLOSURE

In general, this disclosure describes techniques related to scalable video coding (SVC). In some embodiments, multi-hypothesis motion compensation using both explicitly encoded hypotheses and implicitly derived hypotheses are used in order to lessen image distortion due to video compression. For example, while coding a video unit in an enhancement layer, video coders can use information from a reference layer to obtain additional motion compensation data that can be used to identify additional hypotheses. As these additional hypotheses are implicitly derived from data already existing data in a video bitstream, additional performance in video coding can be gained with little or no additional cost in bitstream size. In another example, motion information from spatially neighboring video units can be used to locate additional hypothesis. The derived hypothesis can then be averaged or otherwise combined with explicitly encoded hypothesis to generate a better prediction of a value of a video unit.

The details of one or more examples are set forth in the accompanying drawings and the description below. Other features, objects, and advantages will be apparent from the description and drawings, and from the claims.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
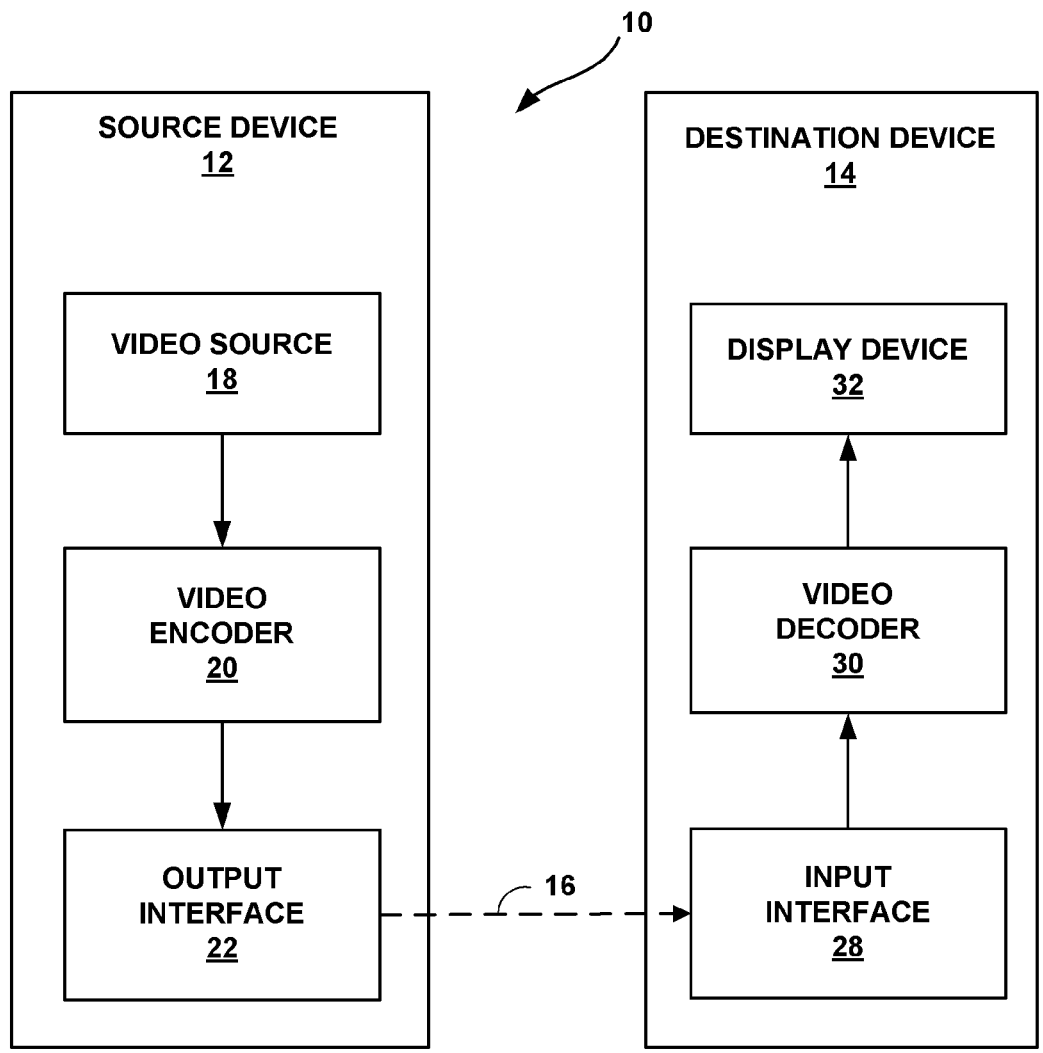
FIG. 1 is a block diagram illustrating an example video encoding and decoding system that may utilize techniques in accordance with aspects described in this disclosure.

The techniques described in this disclosure generally relate to scalable video coding (SVC) and 3D video coding. For example, the techniques may be related to, and used with or within, a High Efficiency Video Coding (HEVC) scalable video coding (SVC) extension. In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or reference layers (RLs). For example, a layer in the middle may be an EL for the layers below it, such as the base layer or any intervening enhancement layers, and at the same time serve as a RL for the enhancement layers above it.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well. In addition, for ease of explanation, the following disclosure mainly uses the terms "frames" or "blocks." However, these terms are not meant to be limiting. For example, the techniques described below can be used with different video units, such as blocks (e.g., CU, PU, TU, macroblocks, etc.), splices, frames, etc.

Video Coding Standards

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://wg11.sc29.org/jct/doc_end_user/current_document.php?id=5885/JCTVC-I1003-v2, as of Jun. 7, 2012. Another recent draft of the HEVC standard, referred to as "HEVC Working Draft 7" is downloadable from http://phenix.it-sudparis.eu/jct/doc_end_user/documents/9_Geneva/wg11/JCTVC-I1003-v3.zip, as of Jun. 7, 2012. The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012. Each of these references is incorporated by reference in its entirety.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.).

An enhanced layer may have different spatial resolution than a base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In the SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer.

In some embodiments of inter-layer motion prediction, the motion data of the base layer (e.g., for the co-located block) may be used to predict the current block in the enhancement layer. For example, while coding a video unit in an enhancement layer, video coders can use information from a reference layer to obtain additional motion compensation data that can be used to identify additional hypotheses. As these additional hypotheses are implicitly derived from data already existing data in a video bitstream, additional performance in video coding can be gained with little or no additional cost in bitstream size. In another example, motion information from spatially neighboring video units can be used to locate additional hypothesis. The derived hypothesis can then be averaged or otherwise combined with explicitly encoded hypothesis to generate a better prediction of a value of a video unit.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. In some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be co-located with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of CFV, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
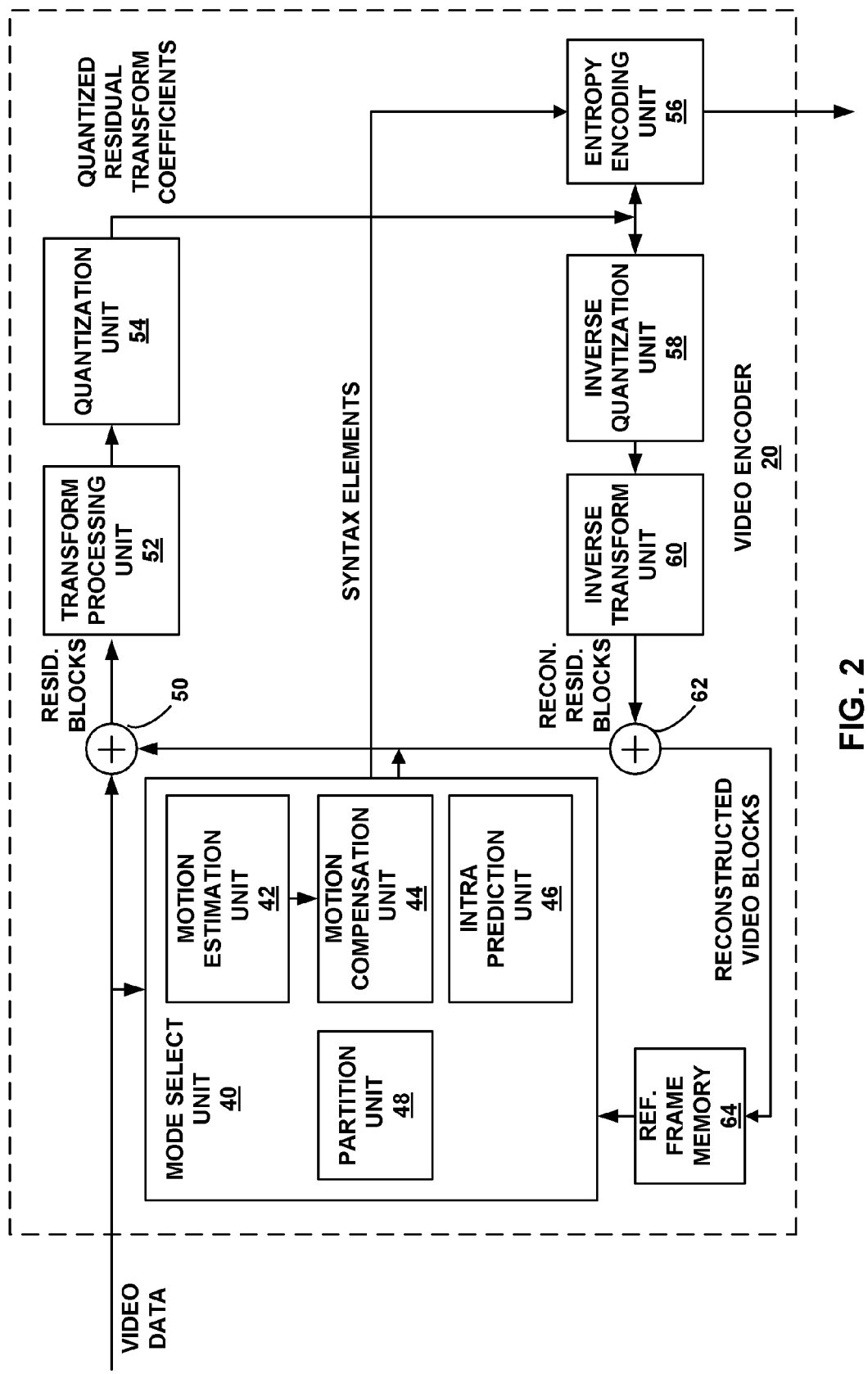
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
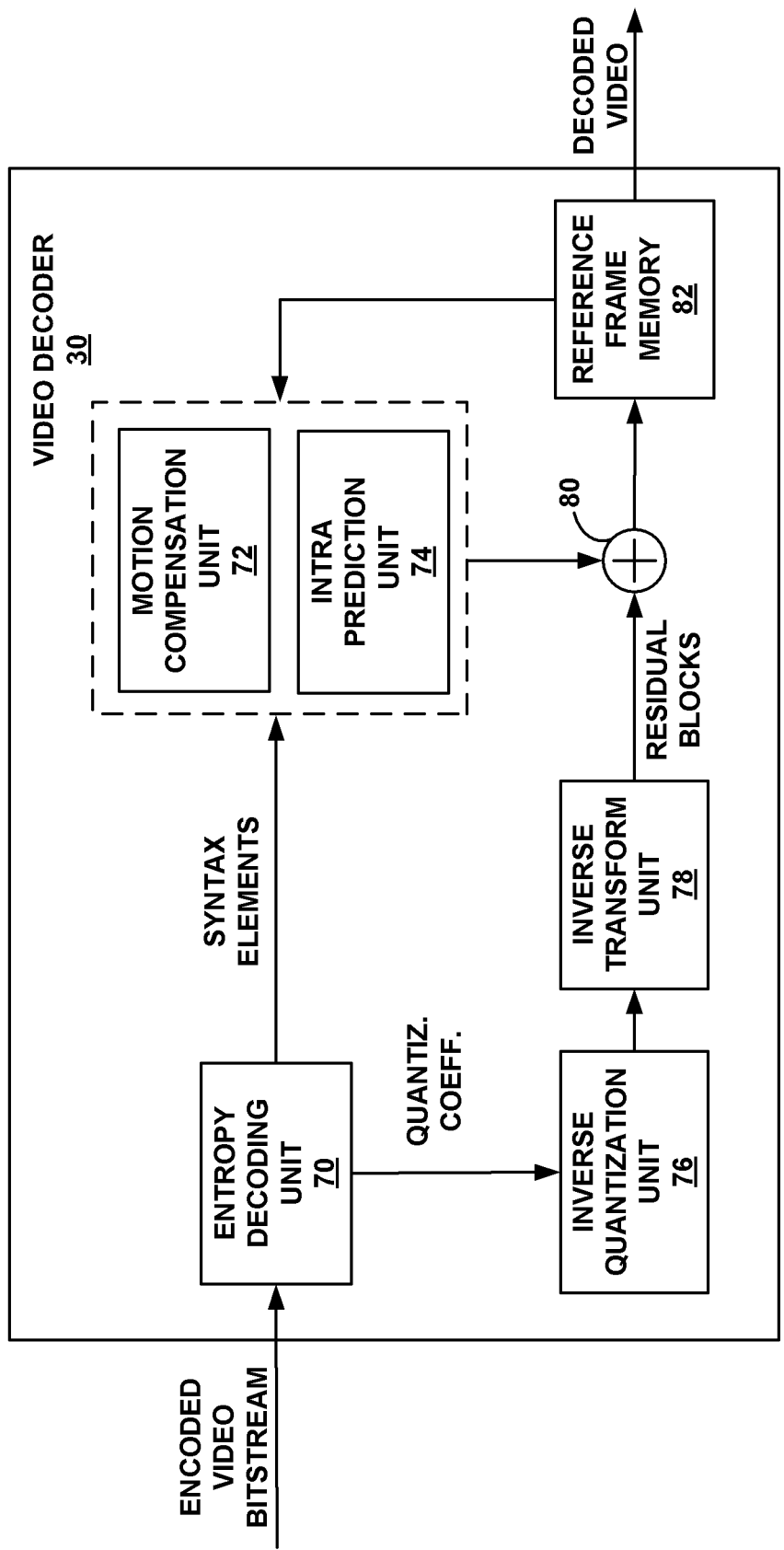
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 80. The inverse quantization process may include use of a quantization parameter QPY calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Motion Compensation in HEVC

As mentioned above, HEVC is the next generation of video coding standard. In general, HEVC follows the framework of previous video coding standards. The motion compensation loop of HEVC is kept the same as that in H.264/AVC, i.e., the reconstruction of the current frame $\hat{I}$ equals de-quantized coefficients r plus temporal prediction P:

$$\hat{I} = r + P,$$

where P indicates uni-directional prediction for P frames or slices or bi-directional prediction for B frames or slices.

The unit of motion compensation in HEVC is different from that in previous video coding standards. In fact, the concept of macroblock in previous video coding standards does not exist in HEVC. Instead, the macroblock concept is replaced by a highly flexible hierarchical structure based on a generic quadtree scheme. Within this scheme, three types of blocks, i.e., Coding Unit (CU), Prediction Unit (PU), and Transform Unit (TU), are defined. CU is the basic unit of region splitting. CU is analogous to the concept of macroblock, but it does not restrict the maximum size and it allows recursive splitting into four equal size CUs to improve the content adaptivity. PU is the basic unit of inter/intra prediction and it may contain multiple arbitrary shape partitions in a single PU to effectively code irregular image patterns. TU is the basic unit of transform. It can be defined independently from the PU; however, its size is limited to the CU which the TU belongs to. This separation of the block structure into three different concepts allows each to be optimized according to its role, which results in the improved coding efficiency.

Generally, in multi-hypothesis motion compensation, more than one motion compensated prediction signal is simultaneously employed to predict the current frame. Today, a B frame is the most common example of two-hypothesis motion compensation. Research conducted on multi-hypothesis motion compensation has found that increasing the number of hypotheses will generally lead to higher coding efficiency. Further research indicates that when the bit cost of motion information of additional hypotheses is considered, two-hypothesis motion compensation is nearly optimal. Therefore, two-hypothesis motion compensation is widely employed in today's video coding standards and practical video codecs, as the benefit of additional quality or coding efficiency gains from using additional hypotheses (e.g., a third or fourth hypotheses) are generally outweighed by the bit cost of encoding the additional motion information for the additional hypotheses. However, the disclosure below describes, in some embodiments, systems and devices that allow additional hypotheses to be used while requiring only minimal additional data to be encoded into a bitstream. Rather, the systems and devices can use pre-existing data to derive the additional hypotheses.

Motion Prediction in HEVC

In HEVC, for each inter predicted unit (PU), individual motion parameters are transmitted. In order to achieve an improved coding efficiency, the block merging process is utilized to select the best motion vector predictor in a so-called merge mode.

The decoding process of an embodiment of the merge mode is described as follows.

Parsing of the index of a candidate list as specified in the prediction unit: merge_idx.

Figure 4:
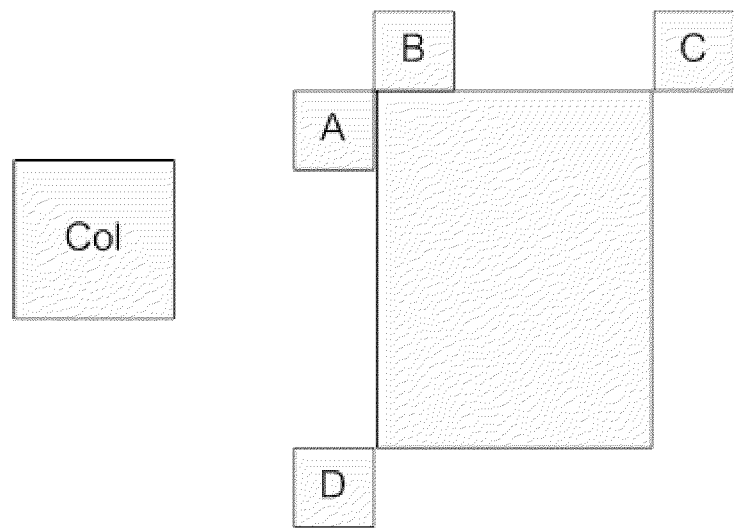
FIG. 4 is a block diagram illustrating example candidate motion vectors according to aspects of this disclosure.

Constructing the merge candidate list according to FIG. 4.

Candidate motion vectors, from spatial neighbors A, B, C, D and temporally co-located block, relative to the current prediction unit, with the following specific order:

A, if availableFlagA is equal to 1

B, if availableFlagB is equal to 1

Col (the temporal co-located block), if availableFlagCol is equal to 1

C, if availableFlagC is equal to 1

D, if availableFlagD is equal to 1

If several merging candidates have the motion vectors and the same reference indices, the merging candidates are removed from the list except the merging candidate which has the smallest order in the merge candidate list.

Selecting the candidate with the parsed merge_idx in the merge candidate list.

In some cases, the reference index and motion vector of the temporal co-located candidate might be scaled, e.g., based on the Picture Order Count (POC). Further, in the SVC or 3D video coding extension of HEVC, the motion of a co-located block in base layer or base view may be put into the merge list.

Motion Vector Prediction

Besides the motion merge mode, motion vector prediction is supported in HEVC. In motion vector prediction, for the current PU, a motion vector predictors (MVP) list is built up. The predictors could be motion vectors from spatial neighbors or/and temporal neighbors. The MVP list contains up to three candidates, spatial left MVP A, spatial top MVP B and temporal MVP Col. One or more of the three candidates might not be available, because e.g., the neighboring blocks are Intra, do not exist. In this case, the MVP list will have less entries and the missing candidate is considered as unavailable.

Figure 5:
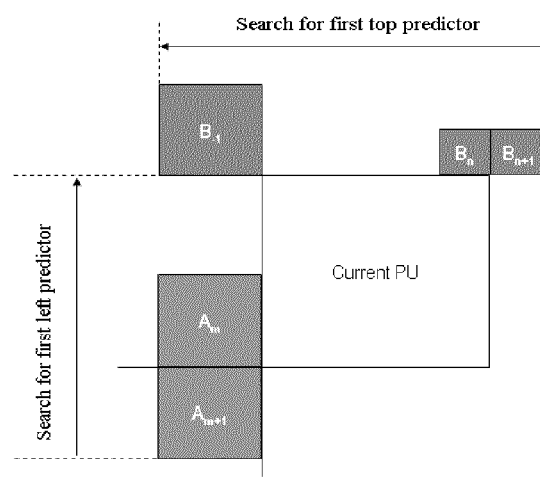
FIG. 5 is a block diagram illustrating spatial candidate scanning according to aspects of this disclosure.

As shown in FIG. 5, for the search of left MVP, two neighboring PUs, Am+1, Am, are used. Similarly, For the search of top MVP, up to three neighboring PUs, Bn+1, Bn, B−1 are used. Without loss of generality, only the generation of the up MVP is described.

A priority-based scheme is applied for deriving each spatial motion vector predictor (MVP) candidate. The priority-based scheme checks several blocks belonging to the same category (e.g., A or B). The motion vectors (MVs) are checked in a certain order as follows:

1) Set the MV to the motion vector of the current checking block. If a MV in the current checking block points to the same reference picture (having the same reference index) as the current PU, the MV is selected to represent the same category, go to (4), else go to (2)

2) If the previous block is already the last block of this category, go to (3), else, set the block to the next block of the category and go to (1).

3) Scaling the MV based on the distances: the POC distance between the current picture and the reference picture of this MV and the POC distance between the current picture and the reference picture of the current PU.

4) Exit

Figure 6:
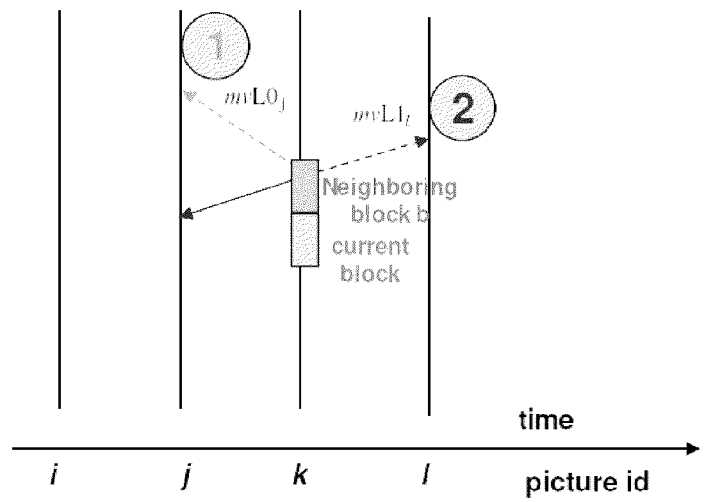
FIG. 6 is a block diagram illustrating an example of deriving a spatial MVP candidate for a B-slice according to aspects of this disclosure.

FIG. 6 shows an example of a B-slice with single reference picture per list (picture j for list 0 and picture 1 for list 1). In FIG. 6, it is assumed that the reference picture for the final MVP is picture j, based on the already signaled ref idx for the current PU. The current list is list 0, and the reference picture of the current PU is picture j. The dotted blue arrow denotes the list 0 MV of the neighboring block, and the dotted red arrow denotes the list 1 MV of the neighboring block. The numbers denote the priorities of the two MVs. When the list 0 MV is available, it is used as the spatial MVP candidate. Otherwise, when the list 1 MV is available, it is scaled to the current reference picture as the solid red arrow based on the POC distances and then used as the spatial MVP candidate.

One temporal motion vector predictor (mvL0Col or mvL1Col) is selected according to the current list and the current reference picture, and added to the MVP list. mvL0Col or mvL1Col are derived based on the motion vectors of the temporal co-located block and the POC difference between the current picture and the current reference picture and the POC difference between the co-located picture and the reference picture referenced by the co-located temporal block.

When there are multiple candidates in the MVP list, an index is signaled to indicate which candidate is to be used. Similar to the merge list, in SVC and 3D video coding of HEVC, the motion of a co-located block in base layer or base view may be put into the MVP list.

Scalable Video Coding

Figure 7:
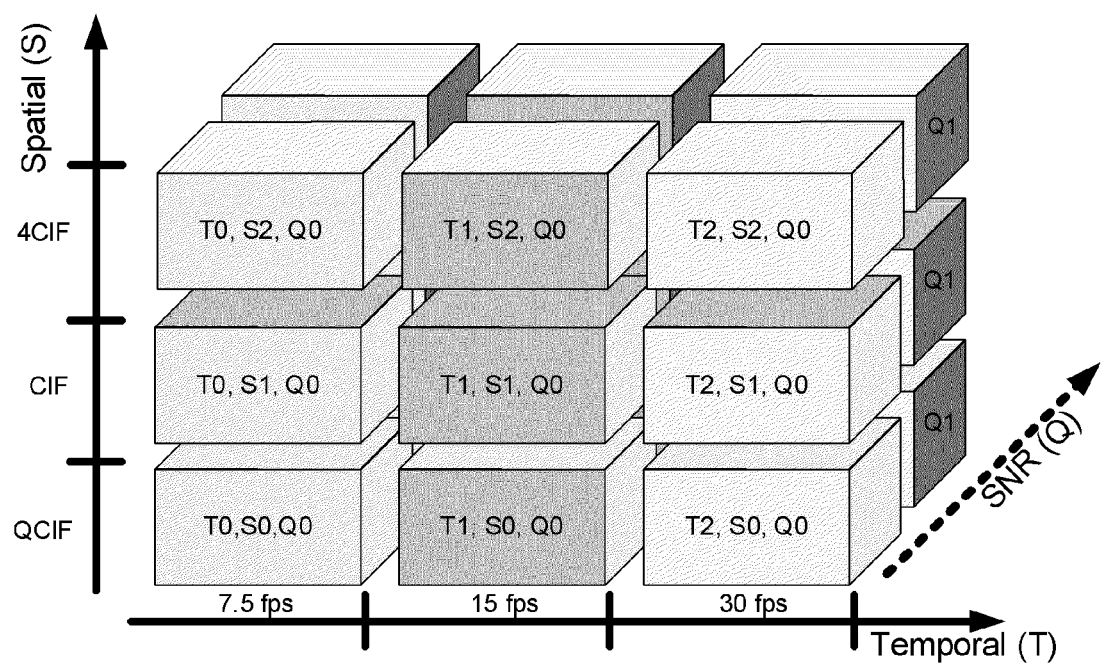
FIG. 7 is a block diagram illustrating scalabilities in three different dimensions according to aspects of this disclosure.

An example of scalabilities in different dimensions is shown in FIG. 7. In the example, scalabilities are enabled in three dimensions. In a time dimension, frame rates with 7.5 Hz, 15 Hz or 30 Hz can be supported by temporal scalability (T). When spatial scalability (S) is supported, different resolutions such as QCIF, CIF and 4CIF are enabled. For each specific spatial resolution and frame rate, the SNR (Q) layers can be added to improve the picture quality. Once video content has been encoded in such a scalable way, an extractor tool may be used to adapt the actual delivered content according to application requirements, which are dependent e.g., on the clients or the transmission channel. In the example shown in FIG. 7, each cubic contains the pictures with the same frame rate (temporal level), spatial resolution and SNR layers. Better representation can be achieved by adding those cubes (pictures) in any dimension. Combined scalability is supported when there are two, three or even more scalabilities enabled.

According to the SVC specification, the pictures with the lowest spatial and quality layer are compatible with H.264/AVC, and the pictures at the lowest temporal level form the temporal base layer, which can be enhanced with pictures at higher temporal levels. In addition to the H.264/AVC compatible layer, several spatial and/or SNR enhancement layers can be added to provide spatial and/or quality scalabilities. SNR scalability is also referred as quality scalability. Each spatial or SNR enhancement layer itself may be temporally scalable, with the same temporal scalability structure as the H.264/AVC compatible layer. For one spatial or SNR enhancement layer, the lower layer it depends on is also referred as the base layer of that specific spatial or SNR enhancement layer.

Figure 8:
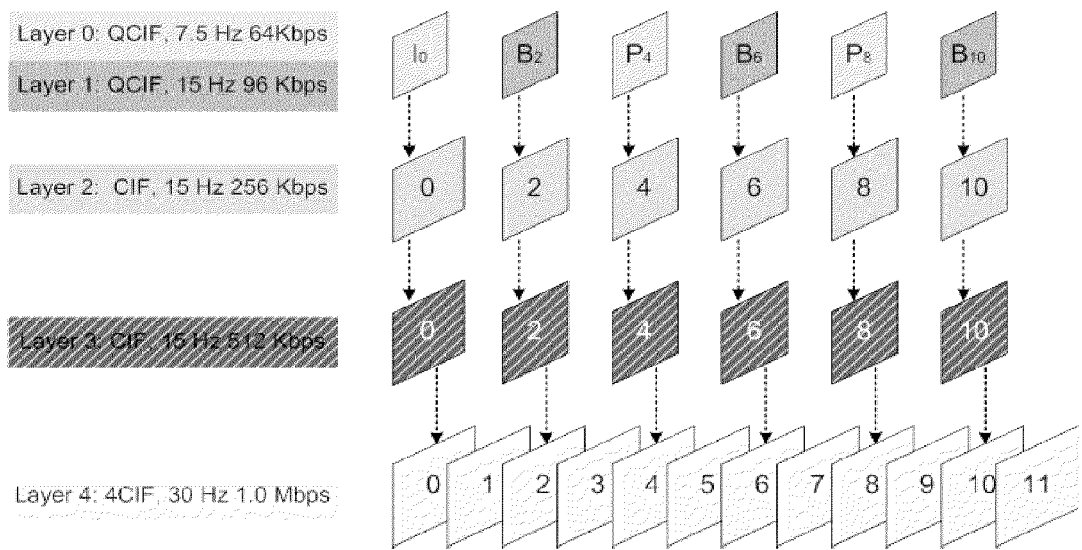
FIG. 8 is a block diagram illustrating an example structure of an SVC bitstream according to aspects of this disclosure.

An example of SVC coding structure is shown in FIG. 8. The pictures with the lowest spatial and quality layer (pictures in layer 0 and layer 1, with QCIF resolution) are compatible with H.264/AVC. Among them, those pictures of the lowest temporal level form the temporal base layer, as shown in layer 0 of FIG. 8. This temporal base layer (layer 0) can be enhanced with pictures of higher temporal levels (layer 1). In addition to the H.264/AVC compatible layer, several spatial and/or SNR enhancement layers can be added to provide spatial and/or quality scalabilities. For instance, the enhancement layer can be a CIF representation with the same resolution as layer 2. In the example, layer 3 is a SNR enhancement layer. As shown in the example, each spatial or SNR enhancement layer itself may be temporally scalable, with the same temporal scalability structure as the H.264/AVC compatible layer. Also, an enhancement layer can enhance both spatial resolution and frame rate. For example, layer 4 provides a 4CIF enhancement layer, which further increases the frame rate from 15 Hz to 30 Hz.

Figure 9:
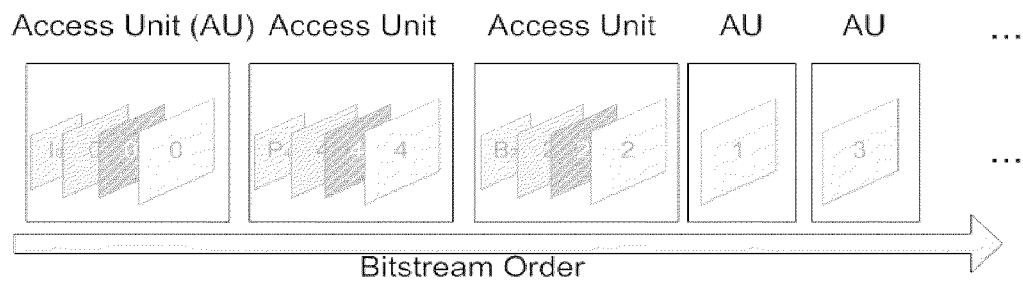
FIG. 9 a block diagram illustrating example SVC access units in a bitstream according to aspects of this disclosure.

As shown in FIG. 9, the coded slices in the same time instance are successive in the bitstream order and form one access unit in the context of SVC. Those SVC access units then follow the decoding order, which could be different from the display order and decided e.g., by the temporal prediction relationship.

Features of Scalable Extensions of H.264/AVC

Some functionalities of SVC are inherited from H.264/AVC. Compared with previous scalable standards, the most important advantages, namely inter-layer prediction and single-loop decoding are reviewed below.

To keep a low-complexity decoder, single-loop decoding is mandatory in SVC. With single-loop decoding, each supported layer can be decoded with a single motion compensation loop. To achieve this, the usage of inter-layer intra-prediction is only allowed for enhancement layer macroblocks, for which the co-located reference layer signal is intra-coded. It is further required that all layers that are used to inter-layer predict higher layers are coded using constrained intra-prediction.

SVC introduces inter-layer prediction for spatial and SNR scalabilities based on texture, residue and motion. Spatial scalability in SVC has been generalized to any resolution ratio between two layers. SNR scalability can be realized by Coarse Granularity Scalability (CGS) or Medium Granularity Scalability (MGS). In SVC, two spatial or CGS layers belong to different dependency layers (indicated by dependency_id in NAL unit header), while two MGS layers can be in the same dependency layer. One dependency layer includes quality layers with quality_id from 0 to higher values, corresponding to quality enhancement layers. In SVC, inter-layer prediction methods are utilized to reduce inter-layer redundancy. They are briefly introduced in the following paragraphs.

The coding mode using inter-layer intra prediction is called "IntraBL" mode in SVC. To enable single-loop decoding, only the MBs, which have co-located MBs in the base layer coded as constrained intra modes, can use inter-layer intra prediction mode. A constrained intra mode MB is intra-coded without referring to any samples from neighboring inter-coded MBs.

If an MB is indicated to use residual prediction, the co-located MB in the base layer for inter-layer prediction must be an inter MB and its residue may be upsampled according to the spatial resolution ratio. The residue difference between the enhancement layer and that of the base layer is coded. That is, the reconstruction of the current frame $Ï_e$ of the enhancement layer equals the sum of de-quantized coefficients $r_e$ of the enhancement layer, the temporal prediction $P_e$ from the enhancement layer, and the quantization normalized residual coefficients $r_b$ of the base layer.

$$Ï_e = r_e + P_e + r_b$$

The co-located base layer motion vectors may be scaled to generate predictors for the motion vectors of MB or MB partition in the enhancement layer. In addition, there is one MB type named base mode, which sends one flag for each MB. If this flag is true and the corresponding base layer MB is not intra, then motion vectors, partitioning modes and reference indices are all derived from base layer.

Multi-Hypothesis Motion Compensation

Figure 10:
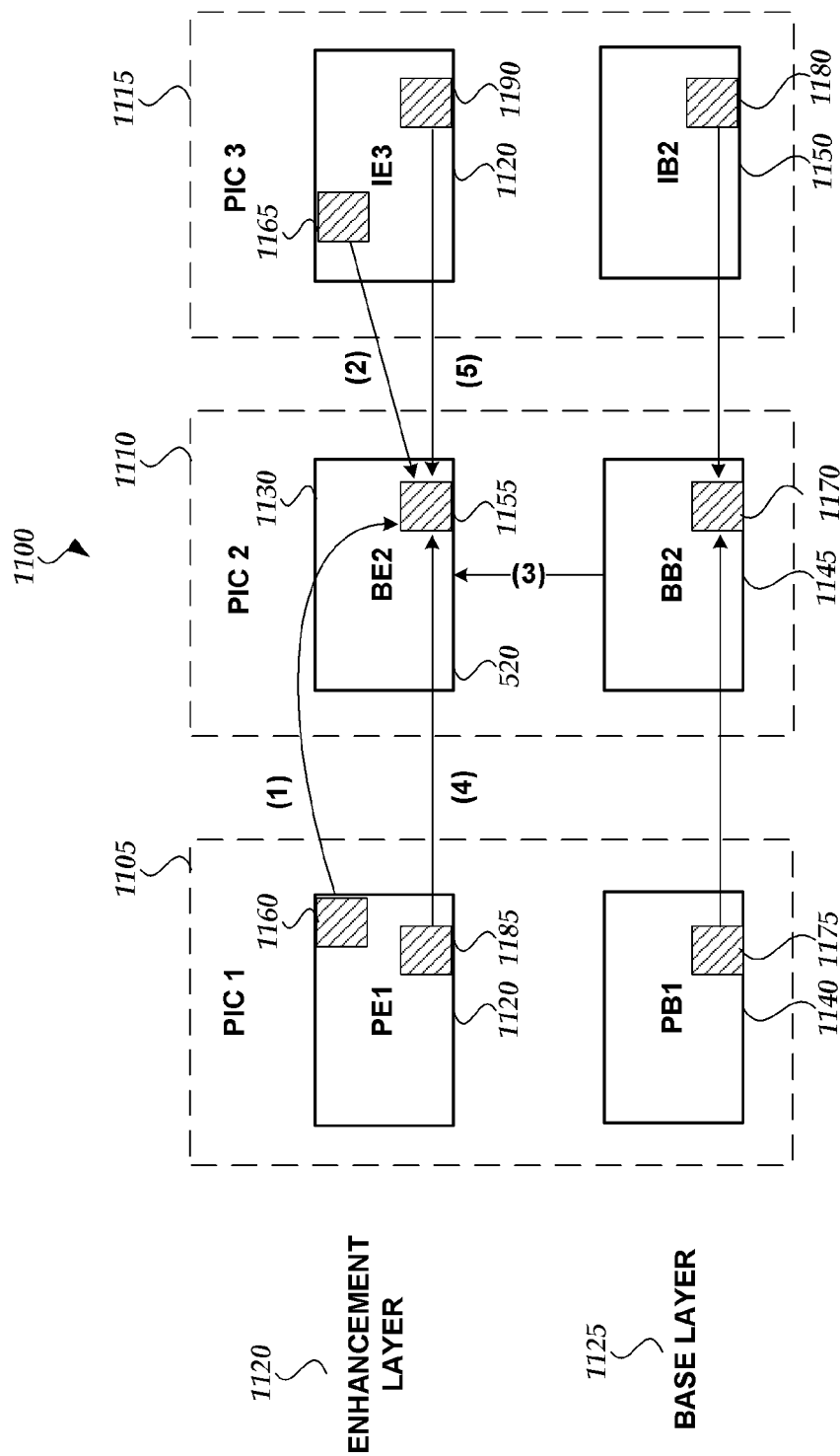
FIG. 10 is a block diagram illustrating an example method for implicit multi-hypothesis motion compensation (IMMC) according to aspects of this disclosure.

FIG. 10 is a block diagram 1100 illustrating an example method for implicit multi-hypothesis motion compensation (IMMC) according to aspects of this disclosure as performed by a coder (e.g., encoder or decoder) implementing IMMC. For convenience, a hypothesis whose motion information is not explicitly coded in bitstream is called an implicit hypothesis in the disclosure while a hypothesis whose motion information is coded in bitstream is called an explicit hypothesis. The techniques described in this disclosure provide an implicit multi-hypothesis motion compensation framework, which can be implemented by decoders and/or encoders.

As discussed above, multi-hypothesis motion compensation is able to provide higher coding efficiency, but at a cost of requiring additional motion information to be coded into the bitstream. However, IMMC beneficially allows certain additional hypotheses to be derived from already existing motion information. In cases of SVC and 3D video coding, motion information of base layer or base view is available when coding an enhancement layer or a dependent view. In some embodiments, IMMC uses this base layer/view information to derive motion information for implicit hypotheses. In addition, embodiments of the IMMC can use the motion information of spatial and temporal neighboring blocks of the current block to locate implicit hypotheses. In some embodiments, an IMMC encoder can indicate to an IMMC decoder that such motion information is available and/or useful to derive implicit hypotheses by setting a flag, mode index, or other indicator in the bitstream for a motion candidate (e.g., a video unit). The IMMC decoder may then derive the implicit hypotheses from already existing data in the bitstream. Thus, in some embodiments, only minimal additional data (e.g., a flag or other indicator) needs to be added to the bitstream in order to use IMMC. Typically, this indicator data is significantly less than the motion information (e.g., a motion vector) for an additional explicit hypothesis.

FIG. 10 illustrates B, P, and I frames for three consecutive pictures (1105, 1110, 1115) for a bitstream having an enhancement layer 520 and a base layer 525. In some embodiments, picture 1105 immediately precedes picture 1110, which immediately precedes picture 1115 in a video. In the enhancement layer are P frame 1 (PE1) 1125, B frame 2 (BE2) 1130 and I frame 3 (IE3) 1135, corresponding to pictures 1, 2, and 3 respectively. In the base layer are P frame 1 (PB1) 1140, B frame 2 (BB2) 1145 and I frame 3 (IB3) 1150, corresponding to pictures 1, 2, and 3 respectively. While FIG. 10 illustrates the three pictures as being a P frame, followed by a B frame, followed by a I frame, in other cases, IMMC may be applied to different combinations of frames, different orders of frames and/or different numbers of frames.

At operation 1, a coder (e.g., encoder or decoder) is encoding or decoding a current video unit 1155 of BE2 1130 of the enhancement layer after already processing the base layer 1125. The coder obtains explicitly coded motion information (e.g., motion vectors or motion compensation data) for BE2 from the bitstream. Such motion information may be stored on memory of the coder. The motion information can allow the coder to identify motion-compensated video units in the preceding frame in time (or another temporally neighboring frame) using inter frame prediction that match or correspond to the current video unit 1155. Using the motion information, the coder identifies explicit hypothesis 1, referencing a video unit 1160 in the preceding frame PE1 1160 as a candidate match for the current video unit 1155.

At operation 2, the coder uses the explicitly coded motion information to identify explicit hypothesis 2, referencing a video unit 1165 in subsequent frame IE3 1165 in time (or another temporally neighboring frame) as another candidate match.

At operation 3, the coder obtains explicitly coded motion information from the base layer 1125 for co-located block 1170 of BB2 1145. As discussed above, BE2 1130 and BB2 1145 are frames of the same picture (picture 2), but on different layers. For example, BB2 may be a lower resolution frame while BE2 is a higher resolution frame of the same picture. The co-located video unit 1170 is in the corresponding position of the picture as the current video unit 1155. The explicitly coded motion information from the base layer 1125 can include motion vectors that identify the hypotheses (1175, 1180) for co-located video unit 1170 in the base layer.

At operation 4 and 5, the coder uses the base layer motion information to derive implicit hypotheses 1185 and 1190. For example, the coder can identify the video units 1175, 1180 identified by the explicit hypotheses for co-located base layer video unit 1170. The coder can then determine the co-located enhancement layer video units 1185, 1190 of those base layer video units 1175, 1180. In some embodiments, the coder scales or otherwise modifies the base layer motion information. For example, the coder can apply a scaling factor to the base layer motion information based on the resolution ratio between the enhancement layer 1120 and the base layer 1125.

Using Scaled Base Layer Motion

In one embodiment of IMMC, up to two implicit hypotheses are allowed in addition to two conventional hypotheses for a Bi-prediction block/PU (e.g., current video unit 1155). In this case, scaled motion of co-located base layer/view PU is used as the motion of implicit hypotheses. Let $V_{e0}$ and $V_{e1}$ represent the motion of two conventional hypotheses, and scaled base layer motion $V_{sb0}$ and $V_{sb1}$ denote the motion of two implicit hypotheses. Since scaled base layer motion can be derived, in one embodiment, only a flag (implicit hypothesis flag) which indicates whether implicit hypotheses are used needs to be coded in bitstream.

Assume that the hypotheses pointed by $V_{e0}$, $V_{e1}$, $V_{sb0}$ and $V_{sb1}$ are $P_{e0}$, $P_{e1}$, $P_{sb0}$ and $P_{sb1}$, respectively. Without loss of generality, it can be further supposed that $P_{e0}$ and $P_{sb0}$ are from reference list 0, $P_{e1}$ and $P_{sb1}$ are from reference list 1. When the four hypotheses are all available, the final prediction P can be obtained by averaging the four hypotheses, e.g., $$P=(P_{e0}+P_{e1}+P_{sb0}+P_{sb1}+o)/4$$

where o indicates rounding offset which may be 0 or 2.

When not all hypotheses are available, such as only $P_{e0}$, $P_{e1}$, and $P_{sb0}$ are available, arithmetic mean of the predictions may be used as the final prediction, e.g., $$P=(P_{e0}+P_{e1}+P_{sb0}+o)/4$$

Where rounding offset o may be 0, 1, or 2.

Since division by 3 can be difficult to implement with hardware, two-step averaging may be applied when not all hypotheses are available. Two-step averaging can be performed by, first, averaging the hypotheses from the same reference list and then, by averaging those of the two lists. For the example above, the final prediction with the two-step average is $$P=((P_{e0}+P_{sb0}+o_1)/2+P_{e1}+o)/2$$

where rounding offsets $o_1$ and o may be 0, or 1.

In one embodiment, the scaling process for the co-located base layer motion may be based on the resolution ratio between base and enhancement layers. For example, when the resolution ratio is r, the scaled co-located base layer motion is $$Vx_{sb}=r \cdot Vx_b$$

$$Vy_{sb}=r \cdot Vy_b$$

where $Vx_b$ and $Vy_b$ denote the x and y components of co-located base layer motion vector, respectively, and $Vx_{sb}$ and $Vy_{sb}$ represent the related scaled enhancement layer motion.

Moreover, additional predefined shifting may also be applied in the motion scaling process, such as shifting by 1 for both motion components. For example:

$$Vx_{sb}=r \cdot Vx_b+1$$

$$Vy_{sb}=r \cdot Vy_b+1$$

In some cases, only $P_{e0}$ and $P_{sb1}$ are available. That is, the enhancement layer motion indicates that the PU is uni-directional predicted from reference list 0 while the base layer motion shows that the PU is uni-directional predicted from reference list 1 (or vice versa). In one embodiment, the coder, instead of using uni-directional prediction, treats the PU as bi-directionally predicted during encoding and/or decoding, even though the PU syntax element inter_pred_idc may indicate that the PU is uni-directionally predicted.

In some embodiments, a unidirectionally predicted video unit is predicted from either 1) one or more video units previous in time to the unidirectionally predicted video unit or 2) one or more video units subsequent in time to the unidirectionally predicted video unit. For example, a first video unit may be in a first frame while the video units used in the prediction are in a second frame previous to or subsequent to the first frame. In some embodiments, a bi-directionally predicted video unit is predicted from both 1) one or more video units previous in time and 2) one or more video units subsequent in time to the bi-directionally predicted video unit.

For example, the coder can use prediction information from an enhancement layer frame previous in time to a current PU and prediction information from a base layer frame subsequent in time to the current PU in order to use multi-hypothesis mode for predicting the current PU. The coder can scale the prediction information (e.g., motion information), if needed. For example, if the current PU is on the enhancement layer, the coder can scale the prediction information from the subsequent base layer frame (e.g., from a second PU on the base layer at a corresponding location) and treat the PU as bi-directionally predicted from the scaled prediction information from the subsequent base layer frame and the prediction information from the preceding enhancement layer frame.

In some embodiments, the coder further uses multi-hypothesis mode, as described above, to predict the current PU that is being treated as bi-directionally predicted. Further, while the above describes the enhancement layer frame as previous in time and the base layer frame as subsequent in time, the above technique can also be applied where the enhancement layer frame as subsequent in time and the base layer frame as previous in time.

In some cases where only $P_{e0}$ and $P_{sb1}$ are available, one of the motion vectors corresponding to the predictors $P_{e0}$ or $P_{sb1}$ can be scaled, making it available for the same reference list as for the enhancement layer or the base layer, and allowing uni-directional multi-hypothesis to be used. In the above example, base layer list 1 motion vector corresponding to $P_{sb1}$ can be scaled making it a motion vector from list 0, and multi-hypothesis mode can be applied as uni-directional prediction for list 0.

After identifying the explicit hypotheses 1160, 1165 and the implicit hypothesis 1185, 1190, the coder can then determine the value for the current video unit 555 based on the values of the video units identified in the explicit and implicit hypotheses. For example, as discussed above, the coder may average the values of those video units (1160, 1165, 1186, 1190) to determine a predicted value for the current video unit 1155. Embodiments of the IMMC process are described in additional detail in FIG. 11 and FIG. 12.

Encoding Process

Figure 11:
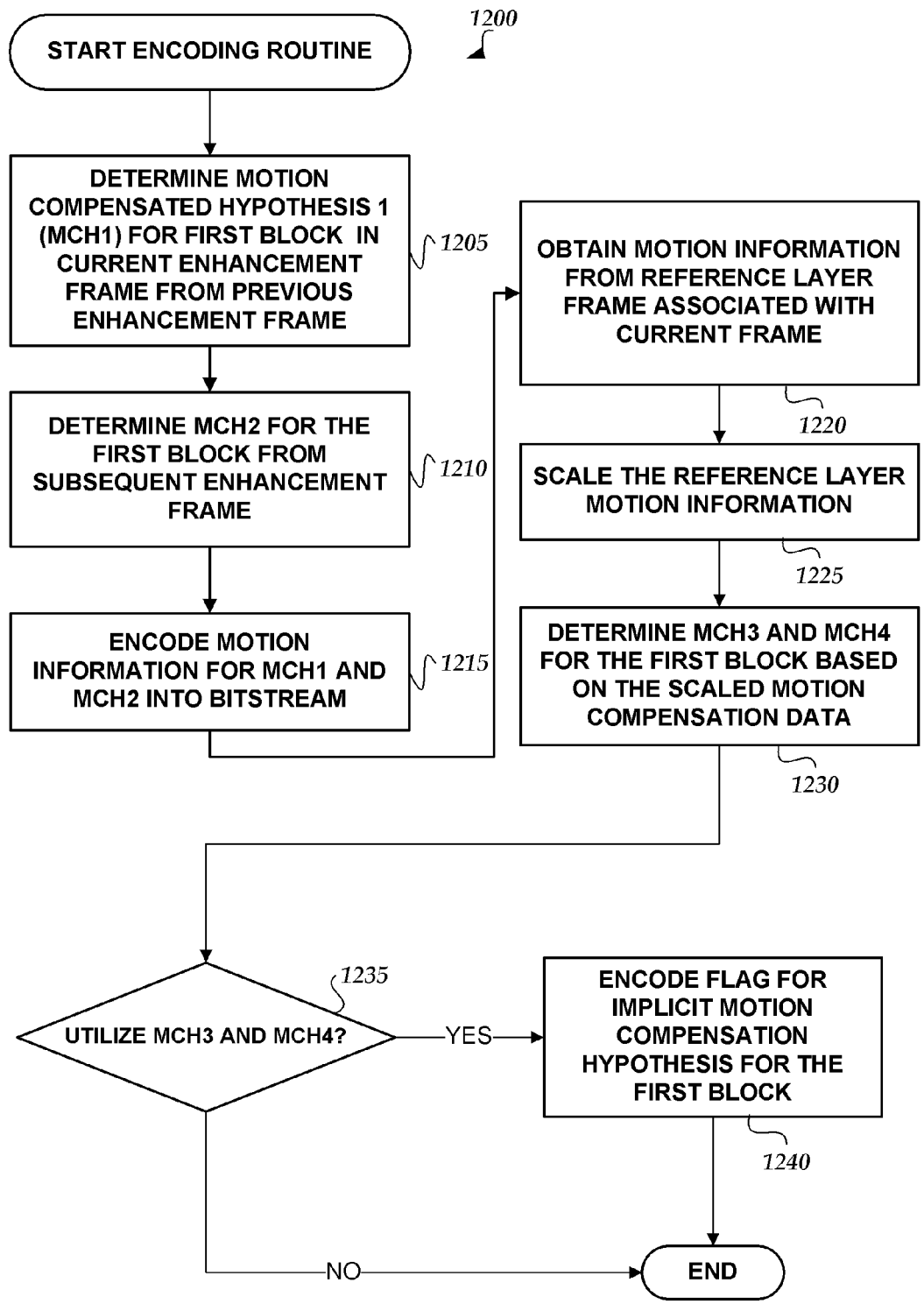
FIG. 11 is a flowchart illustrating an embodiment of a method for an encoding routine according to aspects of this disclosure

FIG. 11 is a flowchart illustrating an embodiment of a method for an encoding routine according to aspects of this disclosure. The process 1200 may be performed by an encoder (e.g., the encoder as shown in FIG. 2), a decoder (e.g., the decoder as shown in FIG. 3), or any other component. The steps of the process 1200 are described with respect to the video encoder 20 in FIG. 2, but the process 1200 may be performed by other components, such as a decoder, as mentioned above.

As discussed above, in some embodiments, up to four hypotheses (two implicit and two conventional (explicit)) are allowed in the enhancement layer/view. The two implicit hypotheses are indicated by predefined motion predictors of the enhancement layer. For example, motion candidates in merge list or MVP list of a PU may be used. To indicate the implicit multi-hypothesis mode, a flag is coded in bitstream. When this flag is true, the motion candidates are checked in the same order as those in merge list and MVP list until the two implicit hypotheses are determined by the motion candidate(s). Generally, the motion of the two implicit hypotheses is different from that of the two conventional hypotheses. However, in some cases, the hypotheses may overlap, partially or wholly.

In another embodiment, the index(es) of motion candidate in merge list or MVP list is coded in bitstream in order to indicate the motion of implicit hypotheses.

At block 1205, the encoder 20 is encoding video data for a first video block (or other video unit) of a first frame of an enhancement layer. The encoder determines the motion compensated hypothesis 1 (MCH1) for the first video block (e.g., the current block being processed by the encoder). MCH1 may identify a video block in a temporally neighboring frame (e.g., a preceding frame or subsequent frame to the current frame of the first video unit).

At block 1210, the encoder 20 determines motion compensated hypothesis 2 (MCH2) for the first video block. MCH2 may identify a video block in a temporally neighboring frame (e.g., a preceding frame or subsequent frame to the current frame of the first video unit). Typically, MCH2 will point to a different block than MCH1. For example, MCH1 may point to a second video block in a preceding frame to the current frame while MCH2 may point to a third video block in a subsequent frame.

At block 1215, the encoder 20 encodes MCH1 and MCH2 (i.e., explicit hypotheses) or the motion information for MCH1 and MCH2 (e.g., using motion vectors) into a bitstream for transmission to a decoder, which can use such information to determine the value for the first video block during decoding. While the current routine 1200 describes identifying MCH1 and MCH2, in some cases the encoder 20 may only determine a single hypothesis.

At block 1220, the encoder 20 obtains motion information from a reference layer frame (e.g., the base layer) associated with the current frame. For example, such a frame may be the corresponding frame in the base layer for the same picture as the current frame in the enhancement layer. In one embodiment, the encoder 20 obtains the motion information for a co-located video block on the reference layer frame that corresponds to the first video block on the enhancement layer frame.

At block 1225, the encoder 20 scales the reference layer motion information. As described above, the encoder can scale or otherwise modify the reference layer motion information. For example, the coder can apply a scaling factor to the reference layer motion information based on the resolution ratio between the enhancement layer and the reference layer.

At block 1230, the encoder 20 determines MCH3 and MCH4 from the scaled reference layer motion information. As discussed in FIG. 10, the layer information can be used to identify MCH3 and MCH4 based on the hypotheses in the reference layer for the co-located reference video block. While the current routine 1200 describes identifying MCH3 and MCH4, in some cases the encoder 20 may only determine a single hypothesis.

At block 1235, the encoder 20 determines whether to direct a decoder to use MCH3 and MCH4 (i.e., implicit hypotheses) in decoding the first video block. In some cases, the encoder 20 may determine that there is no additional coding efficiency obtained by using the implicit hypotheses. For example, the using the implicit hypothesis may not reduce distortion or allow more efficient compression (e.g., if MCH3 and MCH4 have the same values as MCH1 and MCH2).

The encoder 20 can indicate, using a flag or other indicator, whether the decoder should calculate the implicit hypothesis. If the encoder determines that the implicit hypothesis is beneficial, the routine proceeds to block 1240. If the encoder determines that the implicit hypothesis is not beneficial, the routine 1200 can end. In some embodiments, the encoder 20 may need to encode a flag directing a decoder to not perform IMMC before ending the routine (e.g., if the decoder is set to use implicit hypothesis by default.)

At block 1240, the encoder 20 encodes a flag for implicit multi-hypothesis motion compensation (IMMC) into the bitstream. When the decoder receives the bitstream, it can check the IMMC flag for the first video block to determine whether it should calculate implicit hypotheses or only use explicit hypotheses. In some embodiments, the encoder 20 may not need to encode the flag to perform IMMC before ending the routine (e.g., if the decoder is set to use implicit hypothesis by default.)

By signaling when the decoder should not calculate implicit hypotheses, computing resources are not wasted by the decoder. Beneficially, this can increase the decoding speed of the bitstream in comparison to an embodiment that does not use such an indicator to tell the decoder when to use implicit hypotheses. The routine 1200 can then end.

Additional Details on Signaling of Multi-Hypothesis Mode

The proposed multi-hypothesis mode may be enabled/disabled at sequence or frame level. For example, a flag in Sequence Parameter Set (SPS) or Picture Parameter Set (PPS) may be used to indicate the mode.

In some cases, there is little additional coding efficiency gained in performing multi-hypothesis motion compensation for small video units. Thus, in some embodiments, the proposed multi-hypothesis mode may be disabled for CUs/PUs with small size, such as CUs/PUs no larger than 8×8. The parameter to indicate this may be coded at slice or higher level, such as in SPS, PPS, and slice header.

Alternatively, the proposed multi-hypothesis mode may be disabled for CUs/PUs which is coded with specific modes, such as CUs/PUs coded in GRP mode with a non-zero weighting factor; or inter CUs/PUs coded as non-skip or non-merge mode.

In one embodiment, only scaled base layer motion may be employed to indicate implicit hypotheses. In this case, a flag is coded at the inter PU level to indicate the implicit hypothesis mode is used or not. This flag may be coded with one single bit or be coded with CABAC. When using CABAC, information of spatial and temporal neighboring coded PUs, such as the implicit hypothesis mode flag of left and top PUs, may be used to determine the context of the implicit hypothesis mode of the current PU. Moreover, previously coded information of the current PU, such as the merge flag of the current PU, may also be used as the context.

In another embodiment, there are several motion candidates, such as those in the merge list, to locate implicit hypotheses. In this case, an index of motion candidates needs to be coded in the bitstream. When using CABAC to code the index, unsigned integer Exp-Golomb code, truncated unsigned integer Exp-Golomb code, unary code, or truncated unary code [8], may be used to binarize the index. The information of spatial and/or temporal neighboring CUs or PUs may be used as context for CABAC coding. Moreover, the information of current PU, such as merge flag, PU partition, or PU size, may also be used as the context.

In the above embodiment, when the number of motion candidate is above a certain threshold, template matching may be used to prune the candidate. Then the index is signaled. When the candidate number is reduced to less than two, there is no need to explicitly signal the flag or index in bitstream.

In one embodiment, multi-hypothesis mode can be applied for certain prediction modes. In this case, the flag can be coded only for those certain modes. Multi-hypothesis mode may be applied for a first set of prediction modes but not for a second set of prediction modes. For example, multi-hypothesis can be applied only for Merge mode and not applied for Advanced Motion Vector Prediction (AMVP). In this example, a multi-hypothesis flag can be coded only when using Merge mode and not when using AMVP.

In some cases, multi-hypothesis flag and mode index may be derived based on previously coded information. In one embodiment, for inter coded PU other than merge and skip, multi-hypothesis flag or index is always set to 0 and does not need to be coded in bitstream.

In another embodiment, the multi-hypothesis mode flag may also be conditionally coded to further save bit space. First, the availability of an implicit hypothesis is defined as follows: an implicit hypothesis is not available for a PU either when the motion of the implicit hypothesis cannot be derived according to predefined rules, such as co-located PU in the base layer is intra coded and hence no base motion can be used to locate implicit hypothesis, or the derived motion is the same as that of one conventional hypothesis of the current PU. Using such a definition, an encoder can conditionally code the implicit multi-hypothesis mode flag. For example, only when one or more implicit hypotheses of a PU is available, does the encoder code the flag. Otherwise, the flag is not coded and it is set to zero. The availability of implicit hypotheses can also be defined as follows: a PU's implicit hypotheses are marked as unavailable if the PU is in a B slice and is uni-directional predicted. The availability of implicit hypotheses can also be defined as follows: when a PU's merge flag is true and its merge index is not zero, the PU's implicit hypotheses are marked as available. Otherwise, the implicit hypotheses are marked as unavailable.

Figure 12:
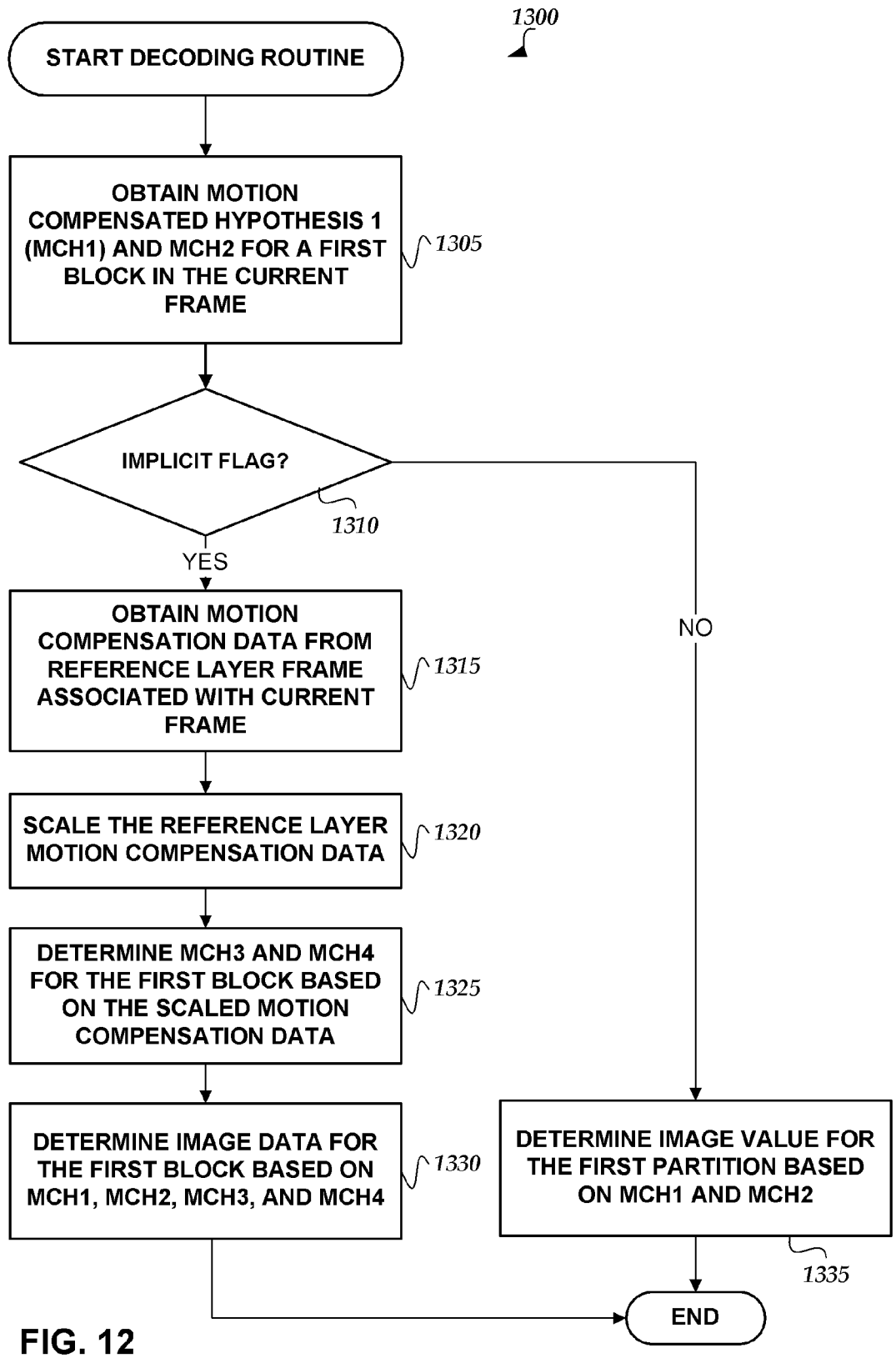
FIG. 12 is a flowchart illustrating one embodiment of a method for a decoding routine according to aspects of this disclosure.

FIG. 12 is a flowchart illustrating one embodiment of a method for a decoding routine according to aspects of this disclosure. The process 1300 may be performed by an encoder (e.g., the encoder as shown in FIG. 2), a decoder (e.g., the decoder as shown in FIG. 3), or any other component. The steps of the process 1300 are described with respect to the video decoder 30 in FIG. 3, but the process 1300 may be performed by other components, such as an encoder, as mentioned above.

At block 1305, the decoder 30 is decoding video data for a first video block (or other video unit) of a first frame of an enhancement layer. The decoder obtains explicit motion information for the first video block from the bitstream (or via memory after storing the information) and determines the motion compensated hypothesis 1 (MCH1) for the first video block (e.g., the current block being processed by the encoder). MCH1 may identify a video block in a temporally neighboring frame (e.g., a preceding or subsequent frame to the current frame of the first video unit).

In some embodiments, the decoder 30 also determines motion compensated hypothesis 2 (MCH2) for the first video block. MCH2 may identify a video block in a temporally neighboring frame (e.g., preceding or subsequent frame to the current frame of the first video unit). Typically, MCH2 will point to a different block than MCH1. For example, MCH1 may point to a second video block in a preceding frame to the current frame while MCH2 may point to a third video block in a subsequent frame.

At block 1310, the decoder 30 determines whether to calculate implicit hypotheses in decoding the first video block, for example, based on an IMMC flag. In some cases, an encoder 20 may have determined that there is no additional coding efficiency (e.g., does not decrease image distortion or improve compression) obtained by using the implicit hypotheses and thus have set/unset a flag such that the decoder is directed to use implicit hypotheses. If the decoder is directed to use implicit hypothesis, the routine proceeds to block 1315. If the decoder is directed not to use implicit hypothesis, the routine proceed to block 1335.

At block 1315, the decoder 30 obtains motion information from a reference layer frame (e.g., the base layer) associated with the current frame. For example, such a frame may be the corresponding frame in the base layer for the same picture as the current frame in the enhancement layer. In one embodiment, the decoder obtains the motion information for a co-located video block on the reference layer frame that corresponds to the first video block on the enhancement layer frame.

At block 1320, the decoder 30 scales the reference layer motion information. As described above, the decoder can scale or otherwise modify the reference layer motion information. For example, the coder can apply a scaling factor to the reference layer motion information based on the resolution ratio between the enhancement layer and the reference layer.

At block 1325, the decoder 30 determines MCH3 and MCH4 from the scaled reference layer motion information. As discussed in FIG. 10, the layer information can be used to identify MCH3 and MCH4 based on the hypotheses in the reference layer for the co-located reference video block. While the current routine 1200 describes identifying MCH3 and MCH4, in some cases the encoder 20 may only determine a single hypothesis.

At block 1330, the decoder 30 determines image data for or the value for the first video block. As described above in relation to FIG. 10, the decoder may calculate the average of the values of MCH1, MCH2, MCH3, and MCH4 (e.g., the value of the video blocks referenced by the hypotheses). In some cases, a rounding offset is added to the hypotheses. The routine 1300 can then end.

Going back to block 1310, if the IMMC flag indicates that no implicit hypotheses should be calculated, the routine 1300 can proceed to block 1335. At block 1335, the decoder 30 determines image data for or the value for the first video block based on the explicit hypotheses, without calculating the implicit hypotheses. For example, the decoder may calculate the average of the values of MCH1 and MCH2. The routine 1300 can then end.

While the above disclosure has described particular embodiments, many variations are possible. For example, as mentioned above, the above techniques may be applied to 3D video encoding. In some embodiments of 3D video, a reference layer (e.g., a base layer) includes video information sufficient to display a first view of a video and the enhancement layer includes additional video information relative to the reference layer such that the reference layer and the enhancement layer together include video information sufficient to display a second view of the video. These two views can used to generate a stereoscopic image. As discussed above, motion information from the reference layer can be used to identify additional implicit hypothesis when encoding or decoding a video unit in the enhancement layer, in accordance with aspects of the disclosure. This can provide greater coding efficiency for a 3D video bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video information, comprising:
identifying a first video unit in a first layer;
determining an explicit hypothesis for predicting the first video unit based on motion information of at least one other video unit in the first layer, explicit hypotheses being hypotheses whose motion information is coded in the video information;
determining a value of a flag, the flag being indicative of whether an implicit hypothesis is used for hypotheses whose motion prediction, information is not coded in the video information;
based on a determination that the value of the flag indicates the use of the implicit hypothesis:
identifying a second video unit in a second layer,
obtaining motion information associated with the second video unit in the second layer, and
determining the implicit hypothesis for predicting the first video unit from the motion information associated with the second video unit in the second layer, and
predicting the first video unit based on the explicit hypothesis and the implicit hypothesis, or
based on a determination that the value of the flag indicates that the implicit hypothesis is not used, predicting the first video unit based on the explicit hypothesis.

2. The method of claim 1, wherein the first video unit and the second video unit each comprise a frame, a slice, a coding unit (CU), a prediction unit (PU), a block, or a region of pixels.

3. The method of claim 1, wherein the first layer is an enhancement layer and the second layer is a reference layer, or wherein the first layer is a dependent view of a 3D video and the second layer is a base view of a 3D video.

4. The method of claim 1, wherein the second video unit in the second layer is spatially co-located with the first video unit in the first layer.

5. The method of claim 1, wherein the at least one other video unit of the first layer is spatially adjacent to the first video unit.

6. The method of claim 1, wherein the at least one other video unit of the first layer is temporally adjacent to, and spatially co-located with, the first video unit.

7. The method of claim 1, wherein the at least one other video unit of the first layer is subsequent in time to the first video unit or previous in time to the first video unit.

8. The method of claim 1, wherein the motion information associated with the second video unit is obtained by scaling a predefined motion vector associated with the second video unit, and wherein the scaling is based on at least one of a difference in spatial resolution and a difference in frame rate between the first layer and the second layer.

9. The method of claim 1, wherein the first video unit is predicted by averaging values of (i) the explicit hypothesis based on a determination that the value of the flag indicates that the implicit hypothesis is not used, or (ii) the explicit hypothesis and the implicit hypothesis based on a determination that the value of the flag indicates that the implicit hypothesis is used and applying a rounding offset of 0, 1, or 2 to the values obtained by averaging.

10. An apparatus for coding video information, comprising:
a memory unit configured to store video information associated with a first layer and a corresponding second layer, the video information including at least motion prediction information for the first layer and second layer; and
a processor in communication with the memory unit, the processor configured to:
identify a first video unit in the first layer;
obtain motion information associated with at least one other video unit in the first layer;
determine an explicit hypothesis for predicting the first video unit based on motion information of the at least one other video unit in the first layer, explicit hypotheses being hypotheses whose motion information is coded in the video information;
encode the motion information for the at least one other video unit in the video information;
identify a second video unit in the second layer;
determine an implicit hypothesis for predicting the first video unit from the motion information associated with the second video unit in the second layer, implicit hypotheses being hypotheses whose motion information is not coded in the video information; and
provide an indication in the video information based on a determination whether the implicit hypothesis is used for predicting the first video unit.

11. The apparatus of claim 10, wherein the first video unit and the second video unit each comprise a frame, a slice, a coding unit (CU), a prediction unit (PU), a block, or a region of pixels.

12. The apparatus of claim 10, wherein the first layer is an enhancement layer and the second layer is a reference layer, or wherein the first layer is a dependent view of a 3D video and the second layer is a base view of a 3D video.

13. The apparatus of claim 10, wherein the second video unit in the second layer is spatially co-located with the first video unit in the first layer.

14. The apparatus of claim 10, wherein the at least one other video unit of the first layer is spatially adjacent to the first video unit.

15. The apparatus of claim 10, wherein the at least one other video unit of the first layer is temporally adjacent to, and spatially co-located with, the first video unit.

16. The apparatus of claim 10, wherein the at least one other video unit of the first layer is subsequent in time to the first video unit or previous in time to the first video unit.

17. The apparatus of claim 10, wherein the motion information associated with the second video unit is obtained by scaling a predefined motion vector, and wherein the scaling is based on at least one of a difference in spatial resolution and a difference in frame rate between the first layer and the second layer.

18. The apparatus of claim 10, wherein the first video unit is predicted at least in part by averaging values of (i) the explicit hypothesis based on a determination that implicit hypothesis is used for predicting the first video unit or (ii) the explicit hypothesis and the implicit hypothesis based on a determination that implicit hypothesis should be used for predicting the first video unit and applying a rounding offset of 0, 1, or 2 to the values obtained by averaging.

19. Non-transitory computer storage having stored thereon instructions that, when executed by a computer system having computer storage, cause the computer system to:
- identify a first video unit in a first layer;
- obtain motion information associated with at least one other video unit in the first layer;
- determine an explicit hypothesis for predicting the first video unit based on motion information of the at least one other video unit in the first layer, explicit hypotheses being hypotheses whose motion information is coded in the video information;
- encode the motion information for the at least one other video unit in the video information:
- identify a second video unit in a second layer;
- determine an implicit hypothesis for predicting the first video unit from motion information associated with the second video unit in the second layer, implicit hypotheses being hypotheses whose motion information is not coded in the video information; and provide an indication in the video information based on a determination whether the implicit hypothesis is used for predicting the first video unit.

20. The non-transitory computer storage of claim 19, wherein the at least one other video unit is spatially adjacent to the first video unit.

21. The non-transitory computer storage of claim 19, wherein the at least one other video unit is temporally adjacent to, and spatially co-located with, the first video unit.

22. The non-transitory computer storage of claim 19, wherein the at least one other video unit is subsequent in time to the first video unit, or is previous in time to the first video unit.

23. The non-transitory computer storage of claim 19, wherein the motion information associated with the second video unit is obtained by scaling a predefined motion vector, and wherein the scaling is based on at least one of a difference in spatial resolution and a difference in frame rate between the first layer and the second layer.

24. The non-transitory computer storage of claim 19, wherein the first video unit is determined at least in part by averaging values of (i) the explicit hypothesis based on a determination that implicit hypothesis should not be used for predicting the first video unit, or (ii) the explicit hypothesis and the implicit hypothesis based on a determination that implicit hypothesis should be used for predicting the first video unit and applying a rounding offset of 0, 1, or 2 to the values obtained by averaging.

25. An apparatus for decoding video information, comprising:
- a memory unit configured to store video information associated with a first layer and a corresponding second layer, the video information including at least motion prediction information for the first layer and second layer; and
- a processor in communication with the memory unit, the processor configured to:
  - identify a first video unit in the first layer;
  - determine an explicit hypothesis for predicting the first video unit based on motion information of at least one other video unit in the first layer, explicit hypotheses being hypotheses whose motion information is coded in the video information;
  - determine a value of a flag, the flag being indicative of whether an implicit hypothesis is used for prediction, implicit hypotheses being hypotheses whose motion information is not coded in the video information; and
  - based on a determination that the value of the flag indicates the use of the implicit hypothesis:
    - identify a second video unit in a second layer,
    - obtain motion information associated with the second video unit in the second layer, and
    - determine the implicit hypothesis for predicting the first video unit from the motion information associated with the second video unit in the second layer, and
    - predict the first video unit based on the explicit hypothesis and the implicit hypothesis, and
  - based on a determination that the value of the flag indicates that the implicit hypothesis is not used, predict the first video unit based on the explicit hypothesis.

26. The apparatus of claim 25, wherein the first video unit and the second video unit each comprise a frame, a slice, a coding unit (CU), a prediction unit (PU), a block, or a region of pixels.

27. The apparatus of claim 25, wherein the first layer is an enhancement layer and the second layer is a reference layer, or wherein the first layer is a dependent view of a 3D video and the second layer is a base view of a 3D video.

28. The apparatus of claim 25, wherein the second video unit in the second layer is spatially co-located with the first video unit in the first layer.

29. The apparatus of claim 25, wherein the at least one other video unit of the first layer is spatially adjacent to the first video unit.

30. The apparatus of claim 25, wherein the at least one other video unit of the first layer is temporally adjacent to, and spatially co-located with, the first video unit.

31. The apparatus of claim 25, wherein the at least one other video unit of the first layer is subsequent in time to the first video unit or previous in time to the first video unit.

32. The apparatus of claim 25, wherein the motion information associated with the second video unit is obtained by scaling a predefined motion vector associated with the second video unit, and wherein the scaling is based on at least one of a difference in spatial resolution and a difference in frame rate between the first layer and the second layer.

33. The apparatus of claim 25, wherein the first video unit is predicted by averaging values of (i) the explicit hypothesis based on a determination that the value of the flag indicates that the implicit hypothesis is not used, or (ii) the explicit hypothesis and the implicit hypothesis based on a determination that the value of the flag indicates that the implicit hypothesis is used and applying a rounding offset of 0, 1, or 2 to the values obtained by averaging.

34. Non-transitory computer storage having stored thereon instructions that, when executed by a computer system having computer storage, cause the computer system to:
- identify a first video unit in the first layer;
- determine an explicit hypothesis for predicting the first video unit based on motion information of at least one other video unit in the first layer, explicit hypotheses being hypotheses whose motion information is coded in the video information;
- determine a value of a flag, the flag being indicative of whether an implicit hypothesis is used for prediction, implicit hypotheses being hypotheses whose motion information is not coded in the video information; and based on a determination that the value of the flag indicates the use of the implicit hypothesis:
identify a second video unit in a second layer,
obtain motion information associated with the second video unit in the second layer, and
determine the implicit hypothesis for predicting the first video unit from the motion information associated with the second video unit in the second layer, and
predict the first video unit based on the explicit hypothesis and the implicit hypothesis, or
based on a determination that the value of the flag indicates that the implicit hypothesis is not used, predict the first video unit based on the explicit hypothesis.

35. The non-transitory computer storage of claim 34, wherein the first video unit and the second video unit each comprise a frame, a slice, a coding unit (CU), a prediction unit (PU), a block, or a region of pixels.

36. The non-transitory computer storage of claim 34, wherein the first layer is an enhancement layer-and the second layer is a reference layer, or wherein the first layer is a dependent view of a 3D video and the second layer is a base view of a 3D video.

37. The non-transitory computer storage of claim 34, wherein the second video unit in the second layer is spatially co-located with the first video unit in the first layer.

38. The non-transitory computer storage of claim 34, wherein the at least one other video unit of the first layer is spatially adjacent to the first video unit.

39. The non-transitory computer storage of claim 34, wherein the at least one other video unit of the first layer is temporally adjacent to, and spatially co-located with, the first video unit.

40. The non-transitory computer storage of claim 34, wherein the at least one other video unit of the first layer is subsequent in time to the first video unit or previous in time to the first video unit.

41. The non-transitory computer storage of claim 34, wherein the motion information associated with the second video unit is obtained by scaling a predefined motion vector associated with the second video unit, and wherein the scaling is based on at least one of a difference in spatial resolution and a difference in frame rate between the first layer and the second layer.

42. The non-transitory computer storage of claim 34, wherein the first video unit is predicted by averaging values of (i) the explicit hypothesis based on a determination that the value of the flag indicates that the implicit hypothesis is not used, or (ii) the explicit hypothesis and the implicit hypothesis based on a determination that the value of the flag indicates that the implicit hypothesis is used and applying a rounding offset of 0, 1, or 2 to the values obtained by averaging.

* * * * *